(12) United States Patent
Bluzer et al.

(10) Patent No.: US 7,375,333 B1
(45) Date of Patent: May 20, 2008

(54) TWO STAGE TRANSFORMER COUPLING FOR ULTRA-SENSITIVE SILICON SENSOR PIXEL

(75) Inventors: Nathan Bluzer, Rockville, MD (US); David C. Harms, Pasadena, MD (US)

(73) Assignee: Northrop Grumman Corporation, Los Angeles, CA (US)

( * ) Notice: Subject to any disclaimer, the term of this patent is extended or adjusted under 35 U.S.C. 154(b) by 111 days.

(21) Appl. No.: 11/494,455

(22) Filed: Jul. 28, 2006

(51) Int. Cl.
*G01J 5/20* (2006.01)

(52) U.S. Cl. .................................. 250/338.4; 505/161

(58) Field of Classification Search ............ 250/338.1, 250/338, 2, 338.3, 338.4, 338.5, 339.01–339.15; 505/161
See application file for complete search history.

(56) References Cited

U.S. PATENT DOCUMENTS

| | | |
|---|---|---|
| 6,489,615 B2 | 12/2002 | Bluzer |
| 7,064,328 B2 | 6/2006 | Bluzer |
| 2003/0222217 A1* | 12/2003 | Luukanen ................ 250/336.2 |

\* cited by examiner

*Primary Examiner*—Kiesha Rose
*Assistant Examiner*—Kiho Kim
(74) *Attorney, Agent, or Firm*—Andrew Kurth LLP

(57) ABSTRACT

A bolometer type ultra-sensitive silicon sensor pixel of a multi-pixel sensor wherein each pixel includes a detector stage, an intermediate stage, and a heat bath stage. The detector stage, the intermediate stage and a portion of the heat bath stage are generally co-planar and are interconnected by I-beam bridges so as to permit mutually co-planar rotation in response to stress and strain. Electrical coupling is improved between a micro-antenna and the detector stage by a two stage transformer assembly that couples the micro-antenna to the detector stage.

15 Claims, 6 Drawing Sheets

TWO STAGE TRANSFORMER COUPLING FOR ULTRA-SENSITIVE SILICON SENSOR PIXEL

GOVERNMENT INTEREST

The U.S. Government has an interest in the subject invention pursuant to Contract No. W911QX-04-C-O0117 from the U.S. Army RDECOM ACQ Center.

CROSS REFERENCE TO RELATED APPLICATIONS

This application is related to Non-provisional application Ser. No. 11/239,275, Publication No. 2006-0076493 A1 entitled "Focal Plane Antenna to Sensor Interface For An Ultra-Sensitive Silicon Sensor", filed on Sep. 30, 2005; Non-provisional application Ser. No. 11/239,297, Publication No. 2006-0081780 A1 entitled "Ultra-Sensitive Silicon Sensor Readout Circuitry", filed on Sep. 30, 2005; Non-provisional application Ser. No. 11/240,772, Publication No. 2006-0081781 A1 entitled "Sensitive Silicon Sensor and Test Structure for an Ultra-Sensitive Silicon Sensor", filed on Oct. 3, 2005; and Non-provisional application Ser. No. 11/302,229 entitled "'I' Beam Bridge Interconnection For Ultra-Sensitive Silicon Sensor", filed on Dec. 14, 2005.

CROSS REFERENCE TO RELATED ART

This application is also related to U.S. Pat. No. 6,489,615 entitled "Ultra-Sensitive Silicon Sensor", which issued on Dec. 3, 2002, and U.S. Pat. No. 7,064,328 entitled "Ultra-Sensitive Silicon Sensor Millimeter Wave Passive Imager", which issued on Jun. 20, 2006. Both of these patents are assigned to the assignee of this invention. U.S. Pat. Nos. 6,489,615 and 7,064,328 are furthermore intended to be incorporated herein by reference for any and all purposes.

FIELD OF THE INVENTION

This invention relates generally to bolometer type radiation sensors for detecting thermal radiation and more particularly to an ultra-sensitive silicon sensor pixel of a multi-pixel sensor including improved signal coupling between a micro-antenna and a thermal radiation detector.

DESCRIPTION OF RELATED ART

Bolometers are well know in the art and comprise devices which generate a voltage output when thermal radiation is absorbed. These devices, moreover, have been successfully used for infra-red (IR) imaging in the long wave infra-red (LWIR) band of the electromagnetic spectrum. Extending these devices to other spectral bands has proven relatively difficult in the past. However, efforts are currently underway to extend this capability from the millimeter wave (mm) to the terahertz (THz) spectral bands and thus there is a need for imagers operating in the mm and THz spectral bands. Applications for such devices include, for example, multi-spectral imaging for improved navigation, target recognition, and detection as well as homeland defense applications. Such applications would greatly benefit from the use of this type of bolometer.

In U.S. Pat. No. 6,489,615, there is disclosed, the structure of a three tiered silicon sensor pixel including a detector stage, an intermediate stage, and a heat bath stage, with the intermediate stage being located between the detector stage and the heat bath stage. The intermediate stage is also part of an electro-thermal feedback loop including an amplifier which generates heat proportional to the temperature difference between the detected temperature provided by a pair of back-to-back temperature sensing silicon diodes respectively located in the intermediate stage and the detector stage. The heat provided by the amplifier in combination with cooling provided by the heat bath act to actively zero the temperature difference between the detector stage and the intermediate stage so as to eliminate any net heat flow between the detector stage and the intermediate stage.

In related application Ser. No. 11/239,275 entitled "Focal Plane Antenna To Sensor Interface For An Ultra-Sensitive Silicon Sensor", there is disclosed both the three tiered and a two tiered semiconductor sensor pixel structure including three stages; namely, a detector stage, an intermediate stage, and a heat bath stage. In the two tiered silicon sensor pixel, the detector stage and the intermediate stage are mutually co-planar, with the upper section being located on the heat bath section.

In related application Ser. No. 11/302,229 entitled "I Beam Bridge Interconnection For Ultra-Sensitive Silicon Sensor", there is disclosed a two tiered silicon sensor pixel wherein the detector stage, the intermediate stage, and a portion of the heat bath stage are mutually co-planar and are interconnected so as to permit mutually co-planar rotation of the detector and intermediate stages while preventing out of plane deflection and deformation between the three stages: detector; intermediate; and heat bath. Interconnection between the three stages is provided by elongated "I" beam type bridge members having a generally rectangular cross section having a height dimension relatively larger than the width dimension, and wherein the bridge members are oriented such that the relatively narrow width dimension is in the direction of the common plane formed by of the co-planar stages, while the relatively larger height dimension is perpendicular thereto.

SUMMARY

It is an object of the present invention to provide improvement in a bolometer type ultra-sensitive silicon sensor pixel of a multi-pixel sensor including a detector stage, an intermediate stage, and a heat bath stage. The detector stage, the intermediate stage and a portion of the heat bath stage are generally co-planar and are interconnected by I-beam bridges so as to permit mutually co-planar rotation to accommodate stress or strain. Inductive coupling between a micro-antenna and the detector stage is improved by inductive coupling between the micro-antenna and the detector stage utilizing a two stage transformer assembly. The two stage transformer assembly is made up of a primary transformer stage, an intermediary transformer stage, and a secondary transformer stage. The primary transformer stage is integrated with the micro-antenna. The intermediate transformer stage is integrated mechanically with the intermediate stage. The secondary transformer stage is integrated mechanically with the detector stage. The intermediate transformer stage has two windings, one is located near the primary transformer stage windings and a second winding is located near the detector stage transformer winding. The two windings in the intermediate stage transformer are interconnected by two small inductances. Two resonance capacitors are used, one is located in the primary transformer stage, and the other one is located on the intermediate transformer stage. The two transformer stage design minimizes overhang found in a single transformer stage design. Minimizing the micro-antenna overhang with a two stage transformer leads to a significantly more robust mechanical structure.

Further scope of applicability of the present invention will become apparent from the detailed description provided hereinafter. It should be understood, however, that the detailed description and specific example, while indicating the preferred embodiment of the invention, is made by way of illustration only, since various changes and modifications coming within the spirit and scope of the invention will become apparent to those skilled in the art from the following detailed description.

BRIEF DESCRIPTION OF THE DRAWINGS

The present invention will become more fully understood when considered in conjunction with the accompanying drawings which are provided by way of illustration only, and are thus not meant to be considered in a limiting sense, and wherein.

DETAILED DESCRIPTION OF THE INVENTION

Figure 1:
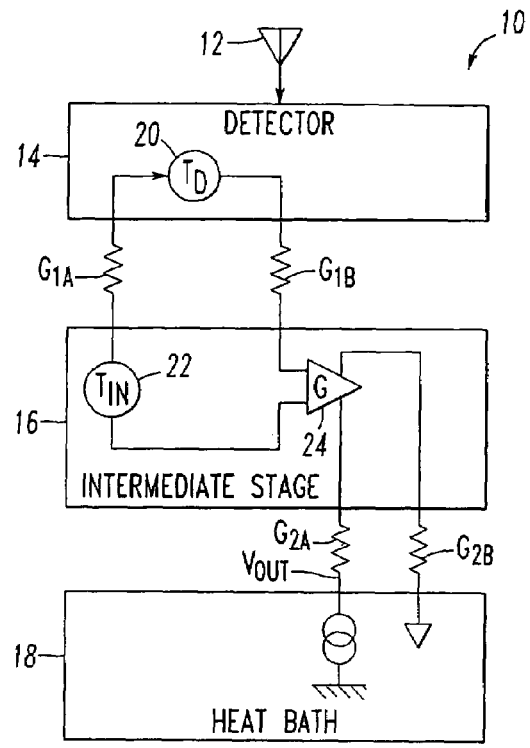
FIG. 1 is an electrical block diagram generally illustrative of an ultra sensitive silicon sensor pixel.

Referring now to the drawings, wherein like reference characters refer to like components, and more particularly to FIG. 1, shown thereat is an embodiment of an ultra-sensitive silicon sensor pixel 10 including active thermal isolation as disclosed in the above referenced related U.S. Pat. No. 6,489,615. The sensor pixel 10 receives incident thermal type electromagnetic energy directly by means of an antenna 12 and includes three major stages; a detector stage 14, an intermediate stage 16, and a heat bath stage 18. Two temperature sensors 20 and 22 are respectively located intermediate the detector stage and the intermediate stage 16 and comprise a pair of semiconductor diodes connected in back-to-back relationship to an amplifier 24, also located in the intermediate stage 16. The amplifier 24 generates heat in an electro-thermal feedback loop that in combination with the heat bath cooling zeroes the difference in temperature between the temperature $T_D$ in the detector stage 14, and the temperature $T_{IN}$ in the intermediate stage 16. Bridge members $G_{1A}$ and $G_{1B}$ link the detector stage 14 and the intermediate stage 16. When the detector stage temperature $T_D$ changes, electro-thermal feedback causes the intermediate stage temperature $T_{IN}$ to change by the same amount. The back-to-back connection of the temperature sensors 20 and 22 produces an input signal which is fed to the amplifier 24 and this signal is amplified to produce heat inside the intermediate stage 16 which depends on the temperature difference between the detector and intermediate stages 14 and 16. If the detector stage 14 is at a higher (smaller) temperature than the intermediate stage 16, the heater output increases (decreases) to zero the temperature difference between the two stages. The thermal conductivity of these links are reduced proportionately to the reduction in the temperature difference between the detector stage 14 and the intermediate stage 16. The intermediate stage 16 is also shown thermally and electrically coupled to the heat bath stage 18 by means of a pair of bridge members $G_{2A}$ and $G_{2B}$. The combination of the adjustable heat provided by the amplifier 24 in the intermediate stage with constant cooling provided by heat bath stage 18 via the bridge members $G_{2A}$ and $G_{2B}$ provides for bipolar temperature tracking of the detector stage by an intermediate stage.

Figure 2:
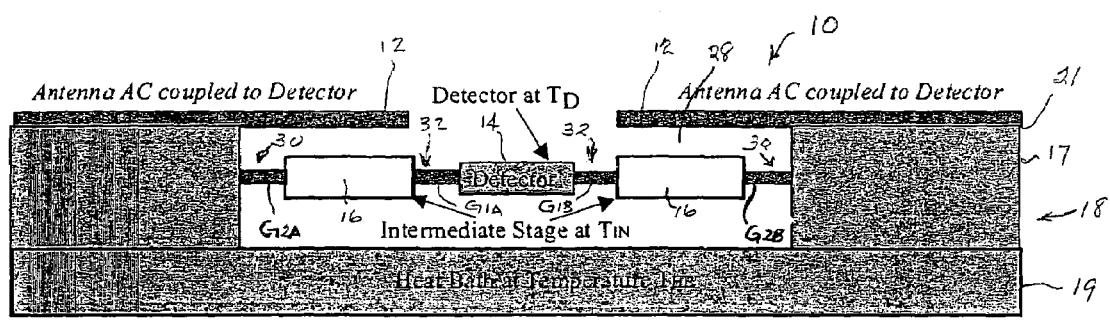
FIG. 2 is a cross-sectional diagram illustrative of an ultra-sensitive silicon sensor pixel of a millimeter wave passive imager related to the subject invention, and being illustrative of a large overhang by the micro-antenna and above the intermediate stage.

Referring now to FIG. 2, shown thereat is a cross-sectional view of a structural representation of a bolometer type sensor pixel 10 where the active components, namely the detector stage 14 and the intermediate stage 16 and an upper section 17 of the heat bath stage 18 are arranged in a common plane. The detector stage 14 comprises a solid circular detector element surrounded by an annular intermediate stage element 16. The detector stage 14 and the intermediate stage 16 are located above a planar lower section 19 of the heat bath stage 18. The upper section 17 of the heat bath stage 18 includes a generally circular cavity 28 in which is located the coplanar detector stage 14 and the intermediate stage 16. A top flat surface 21 of the heat bath section 17 is used for the placement of an antenna element 12 and comprises a passive micro-antenna element which receives incident electromagnetic radiation and funnels it to the detector stage 14. The micro-antenna element 12 is AC coupled and is readily integratable with the active sensor stages 14 and 16.

Figure 3:
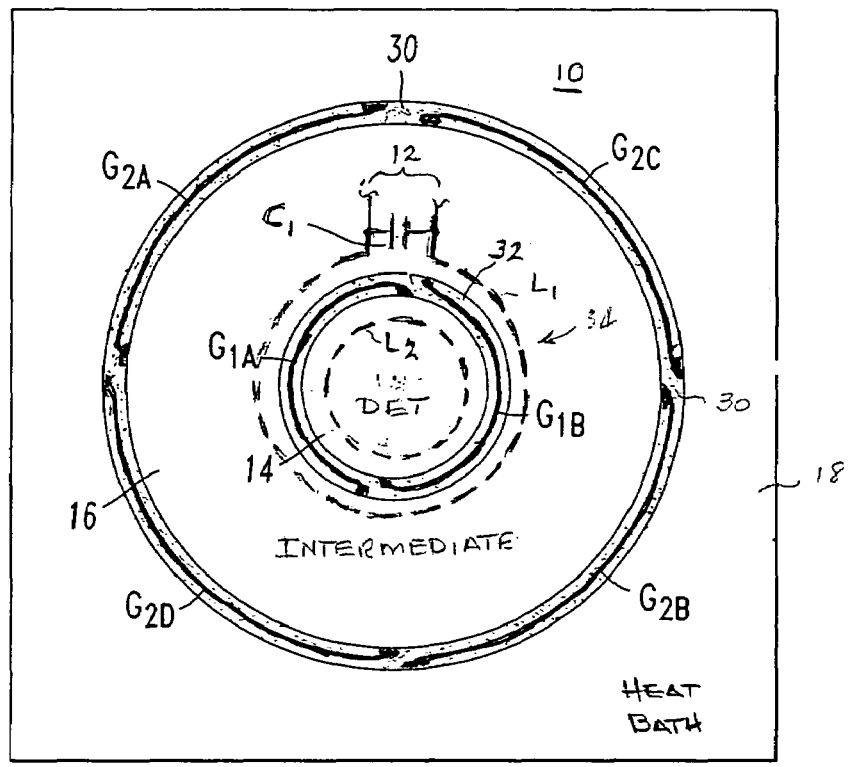
FIG. 3 is a top planar view illustrating the concept of "I" beam bridges mechanically and electrically connecting the detector, intermediate, and heat bath stages in accordance with the related art, wherein a single stage transformer with an $L_1$ primary and an $L_2$ secondary is included.

The three stages 14, 16 and 18 of the sensor 10 are typically fabricated in silicon and are interconnected by connecting bridge members made from sandwiched layers of oxide and a low thermal conducting metal such as nichrome. Given the fabrication temperature and the different thermal expansion coefficients of these materials, provisions must be made to accommodate these differences. This is shown in FIG. 3 and is further disclosed in related application Ser. No. 11/302,229 entitled "I Beam Bridge Interconnection For Ultra-Sensitive Silicon Sensor".

Disclosed in Ser. No. 11/302,229 are interconnected bridge members for the three stages 14, 16 and 18 consisting of two sets of elongated curvilinear bridges $G_{1A}$ and $G_{1B}$ for connecting the detector stage 14 with the intermediate stage 16 and four interconnecting bridges $G_{2A}$, $G_{2B}$, $G_{2C}$ and $G_{2D}$ connecting the intermediate stage 16 with the upper portion 17 of the heat bath stage 18 shown in FIG. 2. The detector stage 14 in a typical embodiment of the sensor 10 as shown in FIG. 3 comprises a circular disc-like element about 10 μm in diameter and the intermediate stage 16 is an annular element approximately 10 μm wide surrounding the detector stage 14.

The interconnecting bridges $G_{1A}$, $G_{1B}$ and $G_{2A}$ and $G_{2B}$, $G_{2C}$ and $G_{2D}$ are in the shape of "I" beams for minimizing out-of-plane physical distortion of the sensor structure where stress or strain induced distortion would otherwise cause out of plane deformation or planing of the detector stage 14 and/or the intermediate stage 16 relative to the micro-antenna element 12. Out-of-plane distortion would reduce coupling between the detector stage 14 and antenna 12 to reduce the signal sensed by the micro-antenna 12 (FIG. 2) from an external scene, not shown. Also, distortion could also cause the micro-antenna 12 to come into mechanical contact with the stages 14 and 16 from which it is supposed to be thermally isolated and thereby eliminating thermal isolation.

Accordingly, the two sets of elongated curvilinear bridge members $G_{1A}$, $G_{1B}$ and $G_{2A}$ ... $G_{2D}$ have a rectangular cross section measuring about 2 μm high and 0.2 μm wide overlaid by a thin nicrome layer of about 0.03 μm thick. Utilizing "I" beam type bridge elements stiffens the structures to out-of-plane movements and contraction (stress) or expansion (strain) in the bridge length will be accommodated by in-plane length changes manifesting themselves by relative rotation between the detector stage 14 via the intermediate stage 16 and the heat bath stage 18. Rotation does not produce out-of-plane distortion thereby maintaining a required electrical coupling and mechanical and thermal isolation between the micro-antenna 12, the detector stage 14, and the intermediate stage 16. Providing means for alleviating stress and/or strain by rotation and not by out of plane distortion, is very important since fabrication and temperature changes in this type of sensor cause stress and/or strain in the bridges. Controlling stress/strain by fabrication techniques is very difficult and impractical. It is, therefore more practical to provide means for mechanical relief by rotation.

In the related art such as disclosed in U.S. Ser. No. 11/302,229, the antenna structure 12 comprises a micro-antenna which overhangs the underlying intermediate and detector stages 14 and 16 as shown in FIG. 2. In an actual embodiment, the overhang is about 18 μm. The space separating the micro-antenna 12 from the upper surfaces of the detector stage 14 and intermediate stage 16, is also about 1.5 μm. This small separation is required to main thermal isolation and to achieve the proper AC coupling between the micro-antenna 12 and the detector 14.

In the fabrication of the related art device, as shown in FIG. 2, the overhang of the micro-antenna 12 partially covers annular spaces 30 and 32, referred to as trench areas, which are used for releasing the structure under the micro-antenna 12 with xenon difluoride ($XeF_2$) etchant during fabrication. The covering provided by the micro-antenna 12 was heretofore mitigated in part, by cutting holes in the micro-antenna 12. Such a solution was found to be less than ideal because it weakened the supporting membrane for the micro-antenna 12 and increased the possibility of physical contact between the micro-antenna 12 and the detector and/or intermediate stages 14 and 16.

Further as shown in FIG. 2, the inner space or trench 32 is not masked by the micro-antenna member 12, while the outer space or trench 30 is covered thereby. In FIG. 3, a capacitance $C_1$ is shown coupled across the primary winding $L_1$ of a single stage transformer 34 having a secondary winding $L_2$ located on the detector stage 14. The trench 32 between the intermediate stage 16 and detector stage 14 includes the bridge members $G_{1A}$ and $G_{1B}$ and provides an annular gap between the primary and secondary windings $L_1$ and $L_2$ as shown in FIG. 3.

Figure 4:
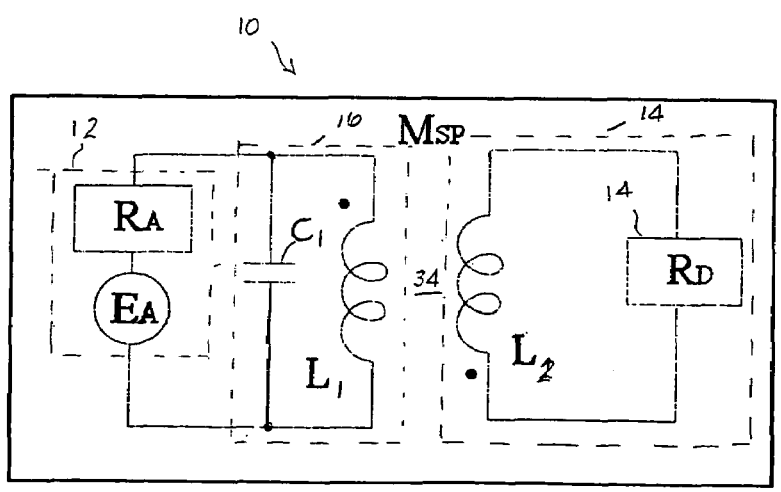
FIG. 4 is an electrical schematic diagram of the related art single stage transformer for the ultra-sensitive silicon sensor pixel shown in FIG. 3.

An electric schematic diagram of the embodiment of the incident related art depicted in FIGS. 2 and 3 is shown in FIG. 4. There $E_A$ corresponds to the signal voltage appearing at the micro-antenna 12 in response to incident radiation and RA is the electrical resistance associated therewith. It can be seen that the capacitance $C_1$ is coupled across the antenna 12 and the primary winding $L_1$. The primary winding $L_1$ is inductively coupled to the secondary winding $L_2$ which is connected to the detector element 14 having a resistance $R_D$.

Figure 5:
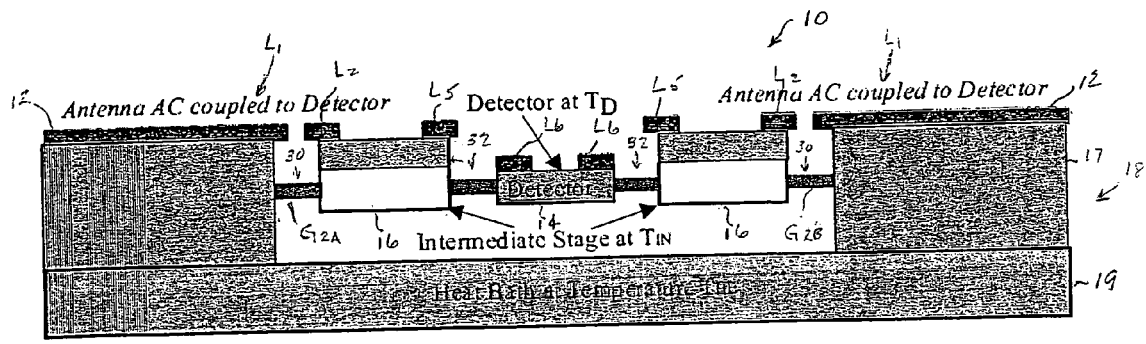
FIG. 5 is a cross-sectional diagram illustrative of a bolometer type sensor pixel illustrative of the preferred embodiment of the subject invention.
Figure 6:
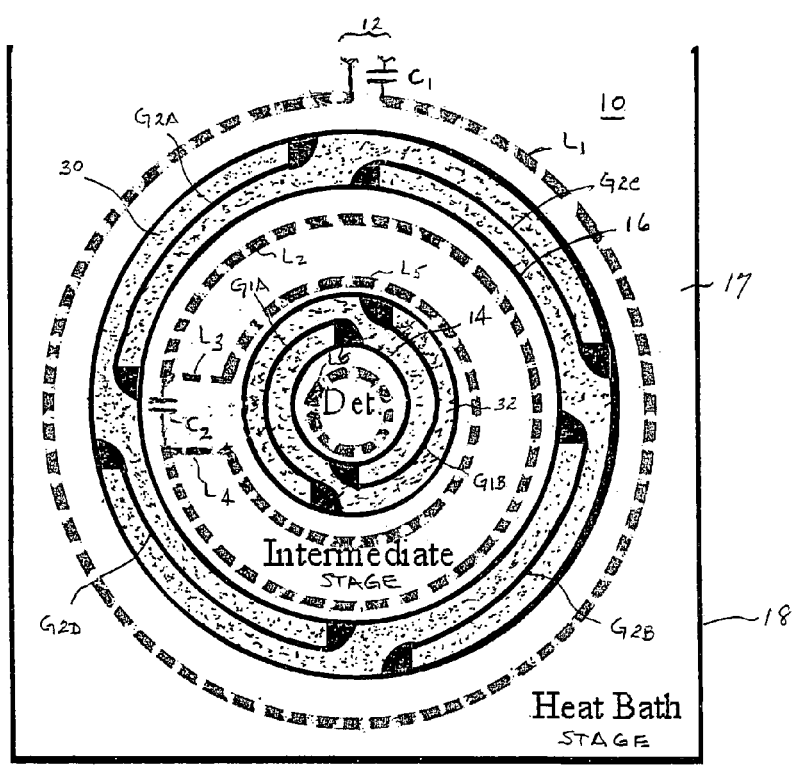
FIG. 6 is a top planar view generally illustrative of the embodiment of the subject invention shown in FIG. 5 and depicting the mechanical and electrical relationship between heat bath, intermediate and detector stages incorporating a two stage transformer design with a primary transformer stage, an intermediate transformer stage, and a secondary transformer stage.

Referring now to FIGS. 5 and 6, the inherent limitations associated with the embodiment shown in FIGS. 2 and 3, which also includes masking of the inner and outer annular spaces or trenches 30 and 32 can be minimized by changing the AC coupling between the micro-antenna 12 and the detector stage 14 from single stage transformer signal coupling to two stage transformer stage signal coupling.

In FIGS. 5 and 6, a two stage transformer embodiment of the subject invention is shown comprising a first transformer stage including a primary winding $L_1$ located on the upper section 17 of the heat bath element 18 and connected to the micro-antenna 12 and a second or intermediate transformer stage with a secondary winding $L_2$ located on the intermediate stage 16 separated by the space (trench) 30. The intermediate stage transformer includes a primary winding $L_2$ and a secondary winding $L_5$ located on the intermediate stage 16 and inductively coupled to a secondary stage winding $L_6$ located on the detector element 14 and separated therefrom by the space (trench) 32. The two intermediate transformer stage windings $L_2$ and $L_5$ have their adjacent pairs of ends connected by inductances $L_3$ and $L_4$ as shown, for example, in FIG. 6.

In the two stage transformer embodiment as shown in FIG. 6, the first transformer stage is capacitively coupled to the antenna 12 by means of a capacitance $C_1$ in series with the primary winding $L_1$ of the first stage, and a capacitance $C_2$ is coupled across the common connection of $L_2$ and $L_5$ to the inductances of $L_3$ and $L_4$.

Figure 7A:
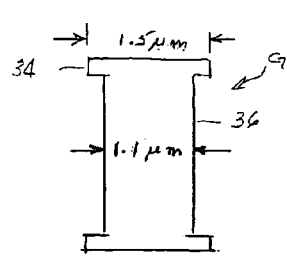
FIGS. 7A and 7B are two cross-sectional views of "I" beam bridges used to interconnect the heat bath, intermediate and detector stages of the sensor pixel shown in FIG. 6.
Figure 7B:
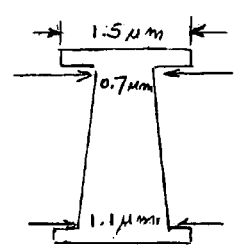

The two stage transformer configuration also includes "I" beam bridges in the same manner as shown in the single stage transformer embodiment shown in FIG. 3, and consists in two inner "I" beam members $G_{1A}$ and $G_{1B}$ mechanically linking the intermediate stage 16 to the detector stage 14 and four outer "I" beam members $G_{2A}$, $G_{2B}$, $G_{2C}$ and $G_{2D}$ mechanically linking the intermediate stage 16 with section 17 of the heat bath stage 18, as shown in FIG. 6. The "I" beam members $G_{1A}$ ... $G_{2D}$ include 1.5 μm wide tabs at the top and bottom and have a body portion 36 typically having a width dimension of 1.1 μm or less as shown in FIG. 7. Alternatively, I beam bridges can have a variable width body portion 36 as shown, for example, in FIG. 7B where the top width is about 0.7 μm and a bottom width of about 1.1 μm.

The two stage transformer embodiment of the subject invention as shown in FIGS. 5 and 6 eliminates the substantial overhang of the micro-antenna element 12 over the intermediate stage 16 shown in FIG. 2.

Figure 8:
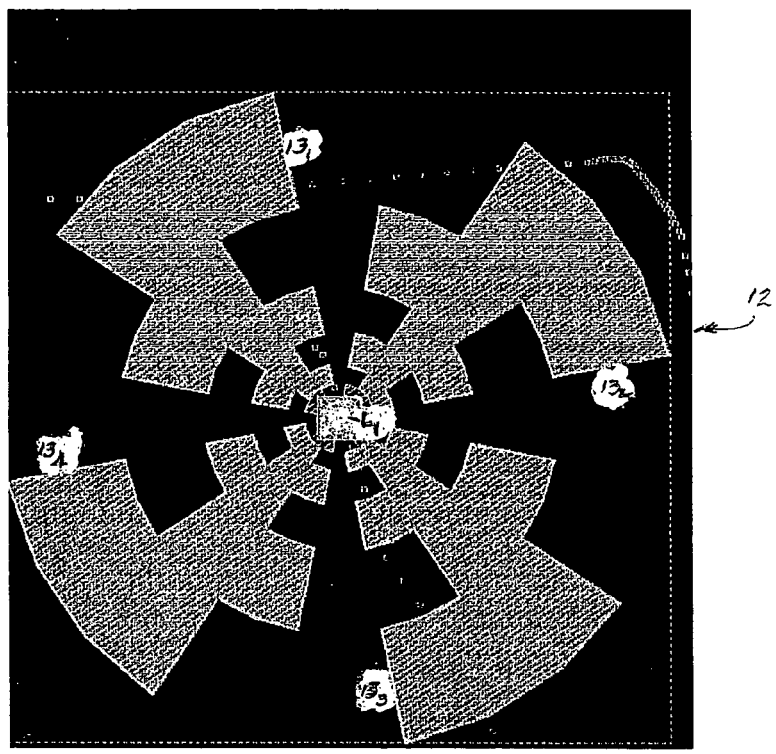
FIG. 8 is a top planar view of a mm-wave micro-antenna used in connection with the embodiment of the subject invention shown in FIGS. 5 and 6.
Figure 9:
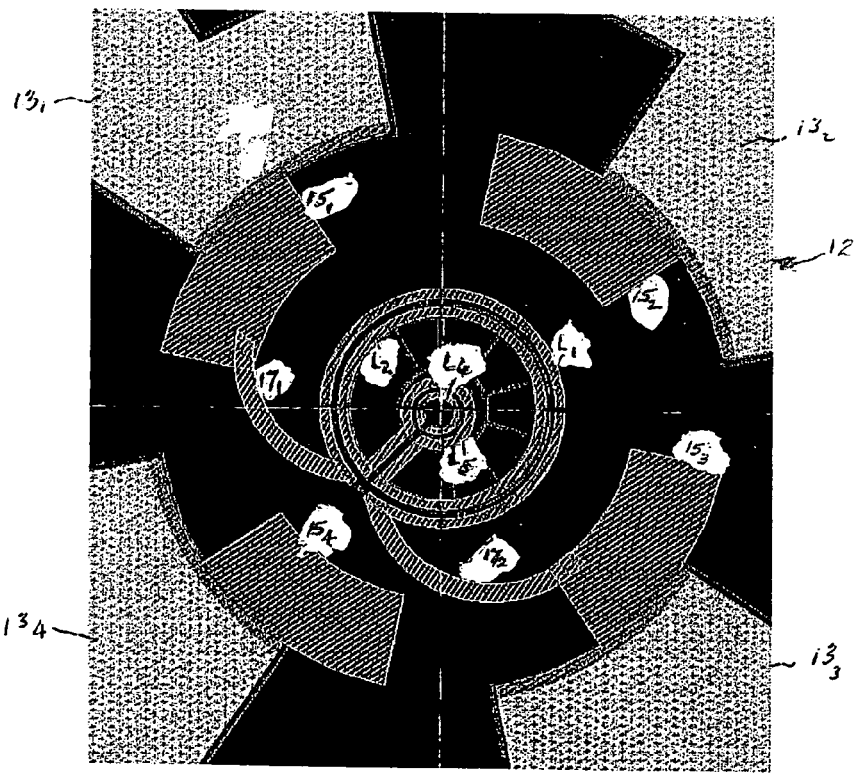
FIG. 9 is a diagram illustrative of the details of the two stage transformer elements connected to micro-antenna shown in FIG. 8.

A top view of an embodiment of the micro-antenna element 12 in accordance with the subject invention is shown in FIG. 8 and consists of four arms $13_1$, $13_2$, $13_3$ and $13_4$ which extend outwardly in increasing sized angulated sections which terminate in circular segments $15_1$, $15_2$, $15_3$ and $15_4$ as shown in FIG. 9.

Two of the segments $15_1$ and $15_3$ are connected to the ends of primary winding $L_1$ via angulated segments $17_1$ and $17_2$, with one of the segments, for example $17_1$, being connected to primary winding $L_1$ via capacitor $C_1$ shown in FIG. 6. FIG. 9 is also illustrative of the two transformer windings $L_2$ and $L_5$ also shown in FIG. 6 where a second capacitance $C_2$ (not shown) is coupled thereacross at the connection of the inductances $L_3$ and $L_4$.

Figure 10:
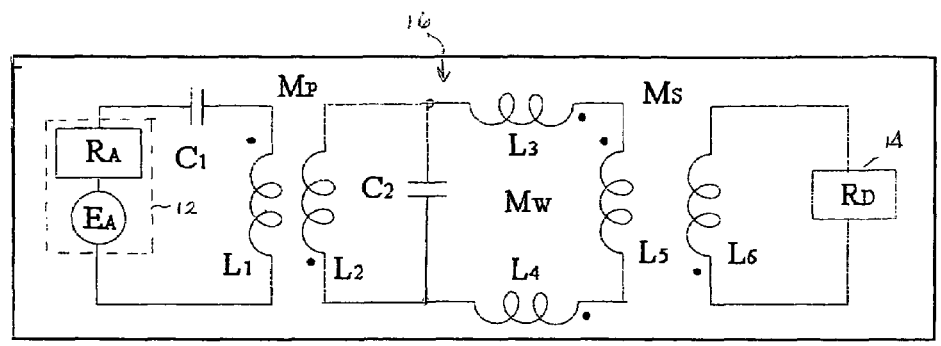
FIG. 10 is an electrical schematic diagram generally illustrative of the embodiment of the invention shown in FIGS. 5 and 6.
Figure 11:
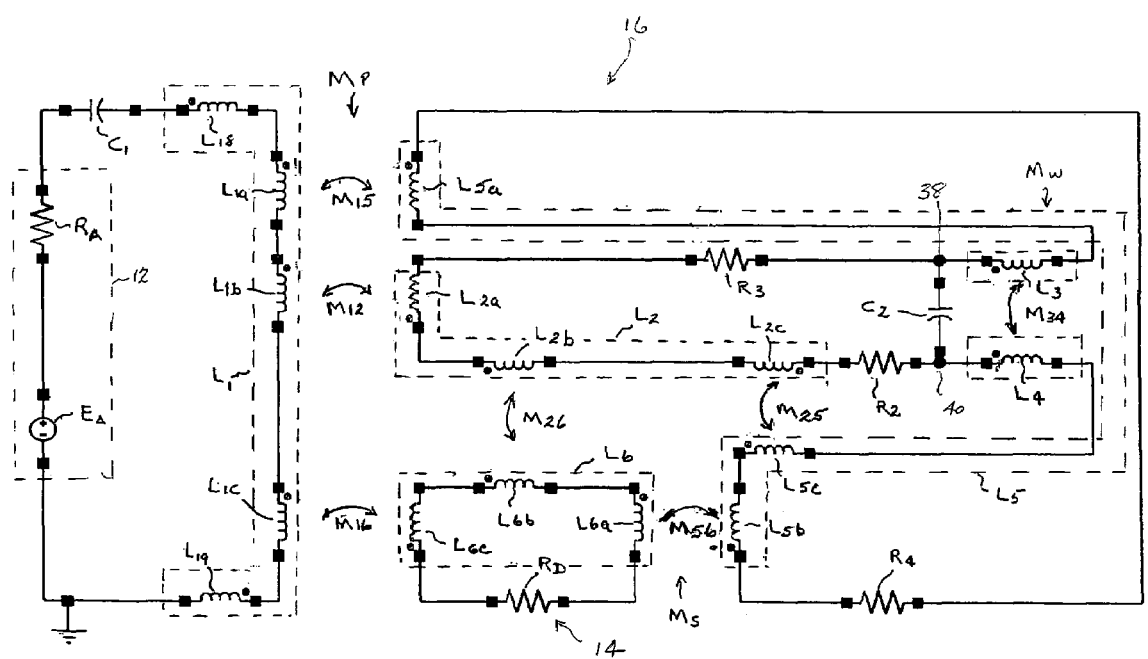
FIG. 11 is a relatively detailed electrical schematic diagram further illustrative of the schematic diagram shown in FIG. 10.

While FIGS. 8 and 9 are illustrative of the physical arrangement of the micro-antenna 12 and the two stage transformer windings for the intermediate and detector sections 16 and 14, FIGS. 10 and 11 are respectively illustrative of a simple and detailed electrical schematic diagram of the two stage transformer embodiment shown in FIGS. 5 and 6.

The detailed schematic diagram of FIG. 11 shows that winding $L_1$ consists of five winding segments $L_{1A}$, $L_{1B}$, $L_{1C}$ and $L_{18}$ and $L_{19}$. The transformer winding $L_2$ of FIG. 10 is shown in FIG. 11 comprised of three winding segments $L_{2A}$, $L_{2B}$, and $L_{2C}$. The inductances $L_3$ and $L_4$ of FIG. 10 are shown in FIG. 11 comprised of single elements coupled to winding $L_2$ at circuit nodes 38 and 40, across which capacitor $C_2$ is also connected. The inner transformer winding $L_5$ of FIG. 10 is shown in FIG. 11 comprised of three winding segments $L_{5A}$, $L_{5B}$ and $L_{5C}$. The secondary winding $L_6$ of the second transformer stage of FIG. 10 is shown comprised of three segments $L_{6A}$, $L_{6B}$, and $L_{6C}$, all connected in series to the resistance RB of the detector 14.

FIG. 11 is further illustrative of the fact that three segments of the first stage transformer winding $L_1$, namely segments $L_{1A}$, $L_{1B}$, and $L_{1C}$ are mutually coupled via $M_{15}$, $M_{12}$ and $M_{16}$ to windings $L_{5A}$, $L_{2A}$, and $L_{6C}$. Also, winding $L_{2B}$ is mutually coupled to winding $L_{6B}$ via $M_{26}$. Mutual coupling $M_{25}$ and $M_{34}$ is also provided between transformer segments $L_{2C}$ and $L_{5C}$ as well as $L_3$ and $L_4$. Lastly, mutual coupling $M_{56}$ is also provided between winding segment $L_{6A}$ and winding segment $L_{5B}$.

It has been found that the input impedance and coupling efficiency of the two stage transformer configuration shown in FIGS. 5 and 6 are relatively broad. Also, the starting frequency can be varied by changing the value of capacitor $C_2$ show in FIGS. 10 and 11.

The two stage transformer configuration, moreover, provides a means for increasing the resistance of the detector stage 14 to match that of the micro-antenna 12. With a two stage transformer, the resistance is increased in two steps allowing a smaller circuit "Q", thereby maximizing the operating bandwidth. Additionally, the parallel resonance at the microwave input node is now a series resonance circuit.

Figure 12:
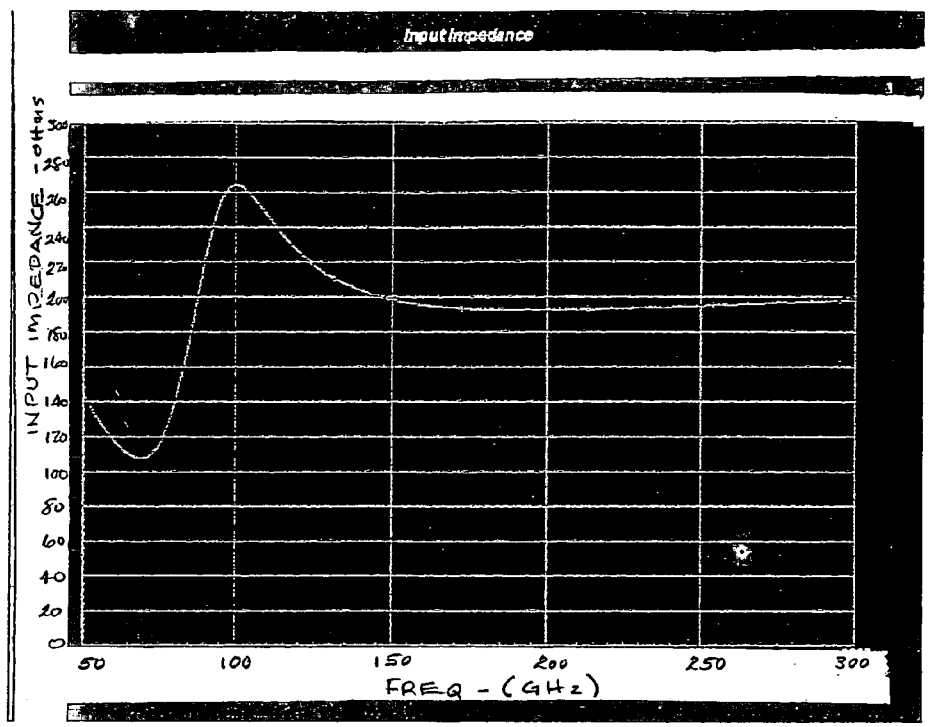
FIGS. 12 and 13 are illustrative performance characteristic curves for the two stage transformer embodiment of the subject invention illustrating input impedance and power transfer efficiency.
Figure 13:
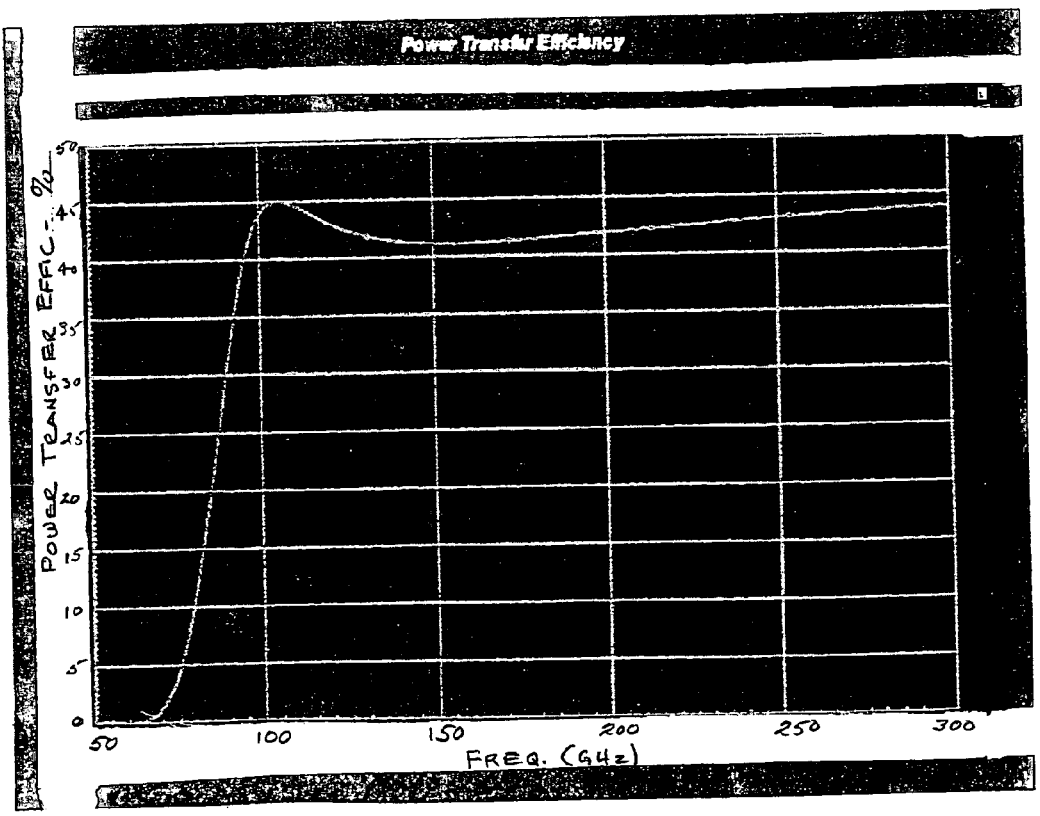

Referring to the curves in FIGS. 12 and 13, illustrative of the input impedance (FIG. 12) as a function of frequency, while FIG. 13 illustrates the power transfer efficiency between the micro-antenna 12 and the load consisting of the resistance $R_D$ of the detector stage 14. A comparison of FIGS. 12 and 13 indicates that a relatively constant power coupling efficiency is achievable over an extremely wide bandwidth above 150 GHz.

Thus what has been shown and described is an improvement in ultra-sensitive silicon sensors by the implementation of a two stage transformer coupling arrangement. This results in a more robust mechanical configuration because of the substantial elimination of the microwave antenna overhang. Moreover, the two transformer embodiment of the subject invention provides for optimum spacing of the detector and the intermediate stages 14 and 16 and the heat bath stage 18. Also, as mentioned above, a much lower "Q" circuit is achieved, thereby offering wide operating bandwidth with optimal impedance matching and power coupling between the micro-antenna 12 and the detector stage 14.

Having thus shown and described what is at present considered to be the preferred embodiment of the invention, it should be noted that the foregoing details and description merely illustrates the principles of the invention. It will thus be appreciated that those skilled in the art will be able to realize various arrangements which, although not explicitly described or shown therein, embody the principles of the invention and are thus in its spirit and scope.

The invention claimed is:

1. A bolometer type thermal radiation sensor pixel of a multi-pixel sensor, comprising:
   an antenna for receiving incident electromagnetic radiation;
   a detector stage, a heat bath stage, and an intermediate stage located between the detector stage and the heat bath stage; and
   a multi-stage transformer assembly coupling thermal radiation received by the antenna to the detector stage.

2. A sensor pixel according to claim 1 wherein the detector stage, the heat bath stage and the intermediate stage are mutually separated from one another, and wherein the antenna comprises a micro-antenna located on an outer surface of an upper body portion of the heat bath stage.

3. A sensor pixel according to claim 2 wherein the multi-stage transformer assembly comprises a two stage transformer assembly including a primary winding of a first transformer stage located on said upper body portion of the heat bath adjacent the antenna, a secondary winding of the first transformer stage located on the intermediate stage, a primary winding of a second transformer stage also located on the intermediate stage, and a secondary winding of the second transformer stage located on the detector stage.

4. A sensor pixel according to claim 3 and additionally including at least one capacitance element coupled to the two stage transformer assembly for providing resonance.

5. A sensor pixel according to claim 4 wherein said at least one capacitance element comprises a capacitor connected in series between the antenna and the primary winding of the first transformer stage.

6. A sensor pixel according to claim 4 wherein said at least one capacitance element comprises a capacitor connected across one of the transformer windings located on the intermediate stage.

7. A sensor pixel according to claim 4 wherein said at least one capacitance element comprises a capacitor connected in series between the micro-antenna and the primary winding of the first transformer stage and a capacitor element connected across one of the transformer windings located on the intermediate stage.

8. A sensor pixel according to claim 7 additionally including first and second inductance elements and wherein the secondary winding of the first transformer stage includes a pair of ends respectively connected to an adjacent pair of ends of the primary winding of the second transformer stage by said first and second inductance elements.

9. A sensor pixel according to claim 8 wherein the upper body portion of the heat bath stage includes a cavity adjacent the antenna and wherein the intermediate stage and the detector stage are located in said cavity.

10. A sensor pixel according to claim 9 wherein the cavity in said upper body portion of the heat bath comprises a circular recess and the intermediate stage comprises a generally annular element including a central circular opening and wherein the detector stage comprises a generally circular element located in said central circular opening of the annular intermediate stage element.

11. A sensor pixel according to claim 10 wherein the annular element of the intermediate stage and the circular element of the detector stage are mutually coplanar in said circular recess of the cavity in the upper body portion of the heat bath stage.

12. A sensor pixel according to claim 11 and wherein a first annular space is located between the upper body portion of the heat bath stage and annular member of the intermediate stage and a second annular space is located between the central circular opening of the intermediate stage and the circular member of the detector stage.

13. A sensor pixel in accordance with claim 12 and including a first set of bridge members located in said first annular space interconnecting the upper body portion of the heat bath stage and annular element of the intermediate stage and a second set of bridge members located in said second annular space interconnecting the annular element of the intermediate stage and the circular element of the detector stage so as to accommodate stress and/or strain by mutual rotation between the respective sensor stages while restricting out of plane deformation between adjacent sensor stages.

14. A sensor pixel in accordance with claim 13 wherein said first and second set of bridge members comprises "I" beam members having a cross section comprising two unequal dimensions, a wider dimension and a narrower dimension, and wherein the wider dimension is substantially transverse to a common plane of the coplanar sensor stages and the narrower dimension is in the direction of said common plane.

15. A sensor pixel in accordance with claim 14 wherein said first set of bridge members includes two bridge members and said second set of bridge members includes four bridge members.

* * * * *